United States Patent
Jones et al.

(10) Patent No.: US 8,513,911 B2
(45) Date of Patent: Aug. 20, 2013

(54) POWER CONVERTERS

(75) Inventors: Rodney Jones, Stoke on Trent (GB);
Christopher Newton, Dursley (GB)

(73) Assignee: Converteam Technology Ltd.,
Warwickshire (GB)

( * ) Notice: Subject to any disclaimer, the term of this patent is extended or adjusted under 35 U.S.C. 154(b) by 82 days.

(21) Appl. No.: 13/214,636

(22) Filed: Aug. 22, 2011

(65) Prior Publication Data

US 2012/0032617 A1 Feb. 9, 2012

Related U.S. Application Data

(63) Continuation-in-part of application No. 12/151,118, filed on May 2, 2008, now Pat. No. 8,008,885.

(30) Foreign Application Priority Data

May 11, 2007 (GB) .................................. 0709094.7

(51) Int. Cl.
*H02P 27/04* (2006.01)

(52) U.S. Cl.
USPC ...... 318/800; 318/227; 318/400.08; 318/802; 318/810; 318/139; 363/39; 363/13; 363/124; 363/47; 363/35; 323/207; 323/215; 322/24; 322/23; 322/28; 322/32; 322/44; 290/43; 290/44; 290/55

(58) Field of Classification Search
USPC .................... 318/800, 227, 254, 345, 139, 51, 318/503, 400.08, 721, 802, 810; 363/39, 363/13, 124, 142, 17, 133, 37, 67, 47, 35; 290/43, 44, 55; 322/23, 24, 28, 32, 44; 323/207, 215
See application file for complete search history.

(56) References Cited

U.S. PATENT DOCUMENTS

| 4,703,189 | A |   | 10/1987 | DiValentin et al. |
| 5,078,628 | A |   | 1/1992 | Garis, Jr. |
| 5,199,912 | A |   | 4/1993 | Dade et al. |
| 5,225,712 | A | * | 7/1993 | Erdman ......................... 290/44 |
| 5,343,139 | A | * | 8/1994 | Gyugyi et al. ................ 323/207 |
| 5,585,708 | A |   | 12/1996 | Richardson et al. |

(Continued)

FOREIGN PATENT DOCUMENTS

| EP | 1580119 A2 | 9/2005 |
| EP | 1626491 A2 | 2/2006 |

(Continued)

*Primary Examiner* — Walter Benson
*Assistant Examiner* — Jorge Carrasquillo
(74) *Attorney, Agent, or Firm* — Kirschstein, et al.

(57) ABSTRACT

A power converter that interfaces a motor requiring variable voltage/frequency to a supply network providing a nominally fixed voltage/frequency includes a first rectifier/inverter connected to a stator and a second rectifier/inverter. Both rectifier/inverters are interconnected by a dc link and include switching devices. A filter is connected between the second rectifier/inverter and the network. A first controller for the first rectifier/inverter uses a dc link voltage demand signal indicative of a desired dc link voltage to control the switching devices of the first rectifier/inverter. A second controller for the second rectifier/inverter uses a power demand signal indicative of the level of power to be transferred to the dc link from the network through the second rectifier/inverter, and a voltage demand signal indicative of the voltage to be achieved at network terminals of the filter to control the switching devices of the second rectifier/inverter.

34 Claims, 2 Drawing Sheets

(56) References Cited

U.S. PATENT DOCUMENTS

| | | |
|---|---|---|
| 6,850,426 B2 | 2/2005 | Kojori et al. |
| 6,933,625 B2 | 8/2005 | Feddersen et al. |
| 7,071,579 B2 | 7/2006 | Erdman et al. |
| 7,253,537 B2 | 8/2007 | Weng et al. |
| 7,256,509 B2 | 8/2007 | Brandt et al. |
| 7,579,702 B2 | 8/2009 | Park et al. |
| 2002/0110007 A1 | 8/2002 | Kalman et al. |
| 2007/0108771 A1* | 5/2007 | Jones et al. .................. 290/44 |
| 2007/0216164 A1 | 9/2007 | Rivas et al. |
| 2007/0267873 A1 | 11/2007 | Teichmann |

FOREIGN PATENT DOCUMENTS

| | | |
|---|---|---|
| GB | 2423650 A | 8/2006 |
| GB | 2432266 | 5/2007 |
| GB | 2432267 | 5/2007 |
| JP | 2007062676 | 3/2007 |
| WO | 92/15148 | 9/1992 |

* cited by examiner

POWER CONVERTERS

CROSS-REFERENCE TO RELATED APPLICATION

This application is a continuation-in-part of U.S. patent application Ser. No. 12/151,118, filed May 2, 2008, now allowed.

FIELD OF THE INVENTION

The present invention relates to power converters, and in particular to power converters that can be used to interface motors operating at variable voltage at variable frequency to a power grid or supply network at nominally fixed voltage and frequency. The present invention also includes features that allow the power converters to remain connected to the supply network and retain control during network fault and transient conditions. The power converters are particularly suitable for use with, but not restricted to, marine propulsion systems.

BACKGROUND OF THE INVENTION

The propeller assembly of a marine vessel typically rotates at variable speed, both in the forward and reverse directions. Where a marine vessel uses an electric power and propulsion system then the motor driving the propeller assembly will also need to operate at variable frequency (for the case where the propeller assembly is driven directly by the rotor of the motor then the frequency will be approximately proportional to the speed of rotation of the propeller assembly) and variable voltage (approximately proportional to frequency). The power system of the marine vessel will have a nominally fixed voltage and frequency and it is therefore necessary to interface the motor to the power system using a power converter.

The power converter will typically consist of two parts: a network bridge that rectifies the ac power from the power system to a nominally fixed dc voltage (the dc link), and a motor bridge that inverts the dc voltage to the appropriate ac voltage for the motor. The power systems of many marine vessels are often referred to as being "weak" since the total generating capacity is closely matched to the total load. This means that when large loads connected to the power and propulsion system are turned on, significant transients (dips) can occur. Any dips or faults on the power system will interfere with the network bridge and its operation to provide the dc voltage. It is therefore normal for the power converter to be turned off to avoid damaging the various components. For many marine applications this requirement to turn off the power converter, and hence the total loss of the associated propulsion equipment, is considered unacceptable.

There is therefore a need for an improved power converter that can remain connected to the power system in the event of a dip or a fault.

SUMMARY OF THE INVENTION

The present invention provides a power converter that can be used to interface a motor that requires variable voltage at variable frequency to a supply network providing a nominally fixed voltage and nominally fixed frequency, the power converter comprising:
- a first active rectifier/inverter electrically connected to the stator of the motor and including a plurality of semiconductor power switching devices;
- a second active rectifier/inverter electrically connected to the supply network and including a plurality of semiconductor power switching devices;
- a dc link connected between the first active rectifier/inverter and the second active rectifier/inverter;
- a first controller for the first active rectifier/inverter; and
- a second controller for the second active rectifier/inverter;
- wherein the first controller uses a dc link voltage demand signal indicative of a desired dc link voltage to control the semiconductor power switching devices of the first active rectifier/inverter to achieve the desired level of dc link voltage that corresponds to the dc link voltage demand signal; and
- wherein the second controller uses a first demand signal to control the semiconductor power switches of the second active rectifier/inverter to control the level of real power to be transferred into and out of the dc link through the second active rectifier/inverter, and a second demand signal to control the semiconductor power switching devices of the second active rectifier/inverter to control the level of reactive power and/or ac voltage at the supply network or, if a filter is connected between the second active rectifier/inverter and the supply network, at the network terminals of the filter.

The power converter can be used to interface the motor to the supply network during situations where the supply network is operating normally, but also includes features that allow it to operate in situations where the supply network voltage is varying due to faults or transients on the supply network. The second controller is also able to control the second active rectifier/inverter to provide voltage support to the supply network when the supply network voltage deviates from its nominal condition.

The motor can be a rotating or linear motor of any suitable type. Examples would include an induction motor or a synchronous motor (excited by any suitable means such as permanent magnets or conventional or superconducting windings). In the case of a rotating motor, the rotor can be connected to a propeller assembly or any other mechanical load requiring ride-through during transients or faults. However, the mechanical load must normally retain sufficient energy (in the form of inertia, momentum etc.) to maintain operation during the time when it is not possible to obtain electrical power from the supply network. A linear motor could be used in applications that require reciprocating motion.

In the case where the motor is an induction motor, the first controller preferably uses a flux demand signal indicative of a desired level of flux to be achieved in the motor to control the semiconductor power switching devices of the first active rectifier/inverter to produce stator electrical quantities that achieve the desired flux in the motor. The term "stator electrical quantities" is used herein to refer to any and all of the individual phase voltage magnitude individual phase current magnitude, phase and frequency in a multi-phase motor.

The operation of the semiconductor power switching devices in the first active rectifier/inverter can be controlled using gate drive control signals derived in accordance with a conventional pulse width modulation (PWM) strategy.

The first controller preferably compares the dc link voltage demand signal indicative of a desired dc link voltage to a dc link voltage feedback signal to determine a torque demand signal indicative of a desired level of torque to be achieved in the motor. The first controller can then control the semiconductor power switching devices of the first active rectifier/inverter to produce stator electrical quantities that achieve the desired torque in the motor. The control implementation described in more detail below is based on vector control, which is a well-known and commonly used technique. However, it will be readily appreciated that any other suitable method of control implementation (such as discrete time field oriented control (DT-FOC) or direct torque control, for example) could be used instead.

The first controller preferably supplies a control signal that varies in accordance with the prevailing motor conditions to the second controller. This control signal can then be used by the second controller to limit the level of power that is transferred to the dc link from the supply network through the second active rectifier/inverter. The control signal therefore prevents any more power being imported into the dc link through the second active rectifier/inverter when the motor has reached its physical performance limits (i.e., when the motor is already operating at its maximum shaft speed or its maximum rate of acceleration, for example).

The first demand signal that is used to control the level of real power to be transferred into and out of the dc link through the second active rectifier/inverter is preferably based on a motor demand (e.g., an operating demand for the motor) and the second controller can use the first demand signal to produce desired motor electrical and mechanical quantities. The term "motor electrical and mechanical quantities" is used herein to refer to any and all of the motor flux, current, voltage, torque, speed and power of the motor.

The second controller preferably uses the first demand signal to determine a quadrature axis current demand signal for the second active rectifier/inverter indicative of a desired quadrature axis current to be achieved in the supply network. The second controller can then control the semiconductor power switching devices of the second active rectifier/inverter to produce filter/supply network electrical quantities that achieve the desired quadrature axis current in the supply network.

The first demand signal can be provided by a suitable controller. The controller can receive one or more of a power reference, a speed reference, torque reference, and a current reference from a vessel control system (which can optionally incorporate a dynamic positioning system). The reference(s) can also be provided directly from control levers of the marine vessel or the like.

The second controller can use the second demand signal to control the semiconductor power switching devices of the second active rectifier/inverter to produce filter/supply network electrical quantities. The term "filter/supply network electrical quantities" is used herein to refer to any and all of the individual phase voltage magnitude, individual phase current magnitude, phase and frequency in a multi-phase active rectifier/inverter system. The term "multi-phase" typically refers to three-phase but can include other numbers of phases. The operation of the semiconductor power switching devices in the second active rectifier/inverter can also be controlled using gate drive control signals derived in accordance with a conventional PWM strategy.

The second controller preferably uses the second demand signal to determine a direct axis current demand signal for the second active rectifier/inverter. The second controller can then control the semiconductor power switching devices of the second active rectifier/inverter to produce filter/supply network electrical quantities that achieve the desired direct axis current in the supply network.

The second controller can modify the direct axis current demand signal in accordance with the prevailing supply network voltage conditions.

A signal indicative of the supply network power is preferably supplied to the first controller from the second controller.

The signal indicative of the supply network power can be added to the output of a dc link controller in the first controller and used to determine a desired level of torque in the motor. The signal effectively provides an advance warning to the first controller that more or less power is going to be imported into the dc link through the second active rectifier/inverter. The first controller can then start to determine the desired level of torque in the motor before the change in the amount of imported power causes a corresponding change in the dc link voltage. This can be important for transient reasons.

The present invention also provides an arrangement comprising a plurality of power converters as described above connected to a common supply bus of a supply network providing a nominally fixed voltage and nominally fixed frequency, wherein the second demand signal is supplied to the second controller of each power converter from a power management system.

Each individual power converter preferably includes a step-down transformer electrically connected between the associated filter and the common supply bus.

The power converter is particularly suitable for use in a propulsion unit for use in marine vessels. The present invention therefore also provides a propulsion unit comprising a motor having a stator and rotor, a propeller assembly including at least one blade rotated by the rotor of the motor, and a power converter as described above. The propeller assembly can be integral with the rotor of the motor. Alternatively, the propeller assembly is mounted to a rotatable shaft and the rotor of the motor is coupled to the rotatable shaft either directly or indirectly through a gearbox.

A plurality of propulsion units can be used in a marine vessel. The present invention therefore also provides a marine vessel comprising a supply network providing a nominally fixed voltage and nominally fixed frequency and having a common supply bus, and a plurality of propulsion units described above. The respective power converters of the plurality of propulsion units are connected to the common supply bus and wherein the second demand signal is supplied by a power management system.

The present invention further provides a method of operating a power converter that can be used to interface a motor that requires variable voltage at variable frequency to a supply network providing a nominally fixed voltage and nominally fixed frequency, the power converter comprising:
 a first active rectifier/inverter electrically connected to the stator of the motor and including a plurality of semiconductor power switching devices;
 a second active rectifier/inverter electrically connected to the supply network and including a plurality of semiconductor power switching devices;
 a dc link connected between the first active rectifier/inverter and the second active rectifier/inverter;
 a first controller for the first active rectifier/inverter; and
 a second controller for the second active rectifier/inverter;
 wherein the method comprises the steps of:
 the first controller using a dc link voltage demand signal indicative of a desired dc link voltage to control the semiconductor power switching devices of the first active rectifier/inverter to achieve the desired level of dc link voltage that corresponds to the dc link voltage demand signal; and
 the second controller using a first demand signal to control the semiconductor power switches of the second active rectifier/inverter to control the level of real power to be transferred into and out of the dc link through the second active rectifier/inverter, and a second demand signal to control the semiconductor power switching devices of the second active rectifier/inverter to control the level of reactive power and/or ac voltage at the supply network or, if a filter is connected between the second active rectifier/inverter and the supply network, at the network terminals of the filter.

The method can include further steps as outlined below.

The first controller can use a flux demand signal indicative of a desired level of flux to be achieved in the motor to control the semiconductor power switching devices of the first active rectifier/inverter to produce stator electrical quantities that achieve the desired flux in the motor.

The first controller can compare the dc link voltage demand signal indicative of a desired dc link voltage to a dc link voltage feedback signal to determine a torque demand signal indicative of a desired level of torque to be achieved in the motor, and control the semiconductor power switching devices of the first active rectifier/inverter to produce stator electrical quantities that achieve the desired torque in the motor.

The first controller can supply a control signal that varies in accordance with the prevailing motor conditions to the second controller. The second controller can then use the control signal to limit the level of power that is transferred to the dc link from the supply network through the second active rectifier/inverter.

The first demand signal can be based on a motor demand and the method can further comprise the step of the second controller using the first demand signal to produce desired motor electrical and mechanical quantities.

The second controller can use the first demand signal to determine a quadrature axis current demand signal for the second active rectifier/inverter indicative of a desired quadrature axis current to be achieved in the supply network, and control the semiconductor power switching devices of the second active rectifier/inverter to produce filter/supply network electrical quantities that achieve the desired quadrature axis current in the supply network.

The first demand signal can be provided by a suitable controller. The controller can receive one or more of a power reference, a speed reference, a torque reference, and a current reference from a vessel control system.

The second controller can use the second demand signal to control the semiconductor power switching devices of the second active rectifier/inverter to produce desired filter/supply network electrical quantities.

The second controller can use the second demand signal to determine a direct axis current demand signal for the second active rectifier/inverter, and control the semiconductor power switching devices of the second active rectifier/inverter to produce filter/supply network electrical quantities that achieve the desired direct axis current in the supply network during a supply network voltage dip situation. The use of the word "dip" in this description in relation to supply network dip situations refers to a situation where the supply network voltage is reduced below its nominal value as a result of either symmetrical or asymmetrical network fault conditions, or simply through the switching of a large inductive component (such as a transformer or harmonic filter, for example) connected to the supply network.

The second controller can modify the direct axis current demand signal in accordance with the prevailing supply network voltage conditions during a supply network voltage dip situation.

The second demand signal can be provided by a power management system.

The second controller can supply a signal indicative of the supply network power to the first controller. The signal indicative of the supply network power can be added to the output of a dc link controller in the first controller and used to determine a desired level of torque in the motor.

The present invention also provides a method of operating a plurality of power converters as described above connected to a common supply bus of a supply network providing a nominally fixed voltage and nominally fixed frequency, the method comprising the step of supplying the second demand signal indicative of the voltage to be achieved at the supply network, or the network terminals of the filter of each power converter, to the second controller of each power converter from a power management system.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Power Converter Topology

Figure 1:
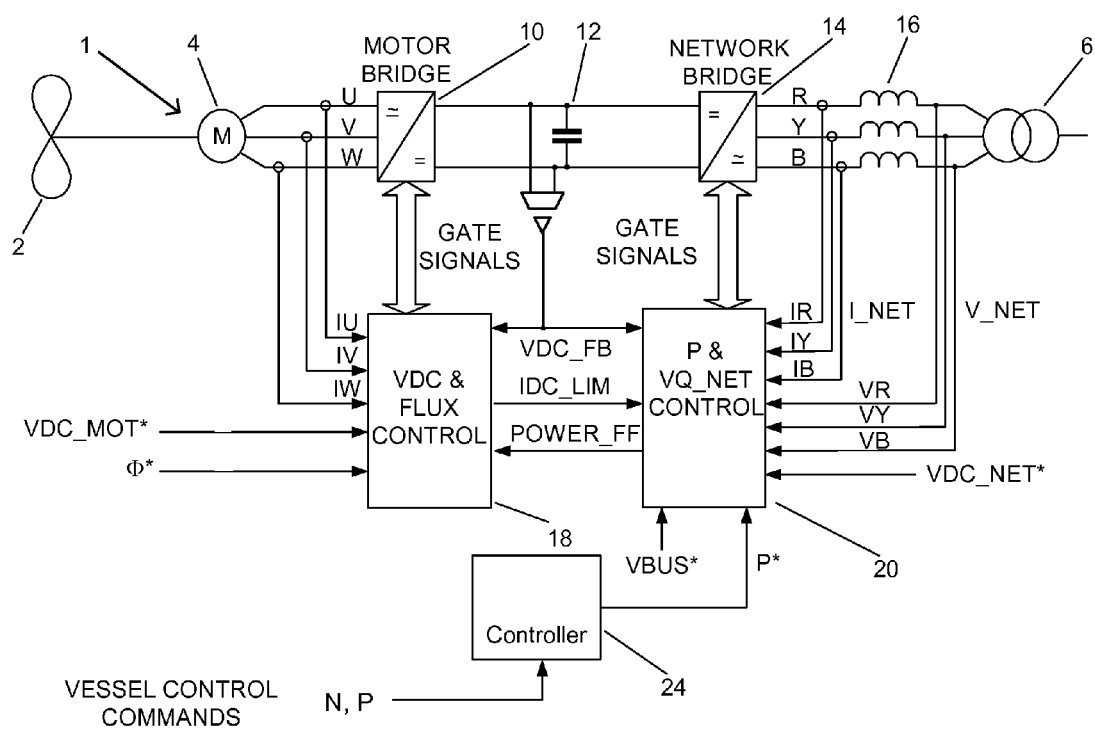
FIG. 1 is a schematic drawing showing how a power converter according to the present invention is used to interface between a motor and a supply bus of a fixed frequency supply network.
Figure 2:
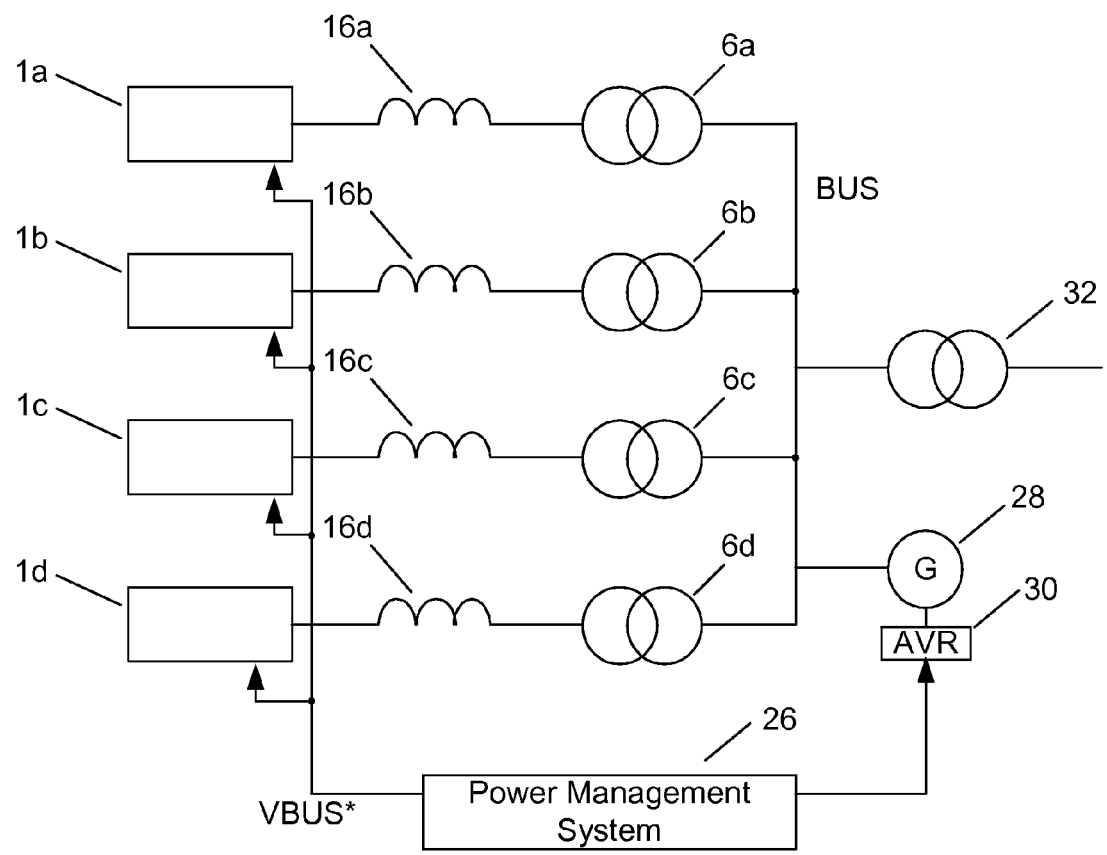
FIG. 2 is schematic drawing showing how a number of power converters according to the present invention can be connected to the supply bus as part of a marine propulsion system.

The basic topology of the power converter will be outlined with reference to FIGS. 1 and 2. Although the power converter is described below in the context of electric marine propulsion systems, it will be readily appreciated that other uses are possible. For example, the power converter can be used as part of a drive system for pumps, fans, compressors or other industrial type loads.

A propeller assembly 2 of an electric marine propulsion system is driven by the rotor (not shown) of a variable speed ac induction motor 4. The propeller assembly 2 will normally consist of a number of blades mounted on a rotating shaft with a fixed pitch. The rotating shaft can be directly connected to the rotor of the motor 4 or indirectly through a gearbox (not shown) that is used to adjust the shaft speed. The speed at which the propeller assembly 2 must rotate will depend on the speed of the marine vessel and the level or direction of thrust required for propulsion. However, because the speed of rotation varies, the voltage and frequency applied to the terminals of the motor 4 must also vary.

The terminals of the motor 4 are connected to the ac terminals of a three-phase motor bridge 10 which in normal operation operates as an inverter to supply power to the motor from a dc link 12. The motor bridge 10 has a conventional three-phase two-level topology with a series of semiconductor power switching devices fully controlled and regulated using a pulse width modulation (PWM) strategy. However, in practice the motor bridge 10 can have any suitable topology such as a three-level neutral point clamped topology or a multi-level topology. The derivation of the gate drive command signals that are used to control the semiconductor power switching devices of the motor bridge 10 is described in more detail below.

A supply network of the marine vessel (FIG. 2) operates at a nominally fixed frequency and includes a common ac supply bus (labelled "bus") that receives power from an ac generator 28. Power is supplied to the ac terminals of a network bridge 14 from the supply bus via a step-down transformer 6 and is filtered by inductors 16 (and other possible filters). Protective switchgear (not shown) can be included to provide a reliable connection to the supply bus and to isolate the propulsion system from the supply network for various operational and non-operational requirements.

The network bridge 14 in normal operation operates as an active rectifier to supply power from the supply bus to the dc link 12. The network bridge 14 has a similar three-phase two-level topology to the motor bridge 10 with a series of semiconductor power switching devices fully controlled and regulated using a PWM strategy. However, in practice the network bridge 14 can have any suitable topology as discussed above for the motor bridge 10. The principal control for the dc input voltage of the motor bridge 10 is achieved by controlling the motor bridge. The network bridge 14 is controlled to meet two principal objectives, namely active power and network voltage. A detailed description of how this control is achieved is provided below.

The derivation of the gate drive command signals that are used to control the semiconductor power switching devices of the network bridge 14 is also described in more detail below.

As described herein, active rectification (as the prime mode of operation of the network bridge 14) is the conversion of energy from the ac terminals of the three-phase network bridge to the dc link and inversion (as the prime mode of operation of the motor bridge 10) is the conversion of energy from the dc link of the three-phase motor bridge to its ac terminals. However, it will be readily appreciated that there can be times when it might be necessary or desirable to operate the motor bridge 10 as an active rectifier and the network bridge 14 as an inverter. For example, in a situation where the marine vessel is braking then the propulsion system can be adapted to support regeneration. In this case the motor 4 can be operated in a generating mode to provide power back to the supply network (or a dump resistor) through the motor bridge 10 operating as an active rectifier and the network bridge 14 operating as an inverter.

In situations where a supply network voltage dip occurs, the network bridge 14 can operate in either an active rectifier mode or in an inverter mode as required in order to provide reactive current into the supply network to counteract the cause of the voltage dip.

Marine Propulsion System Topology

As mentioned briefly above, a number of power converters can be connected to the common ac supply bus of the nominally fixed frequency supply network to define a marine propulsion system. This is shown schematically in FIG. 2. Each power converter 1a to 1d includes an associated filter 16a to 16d and a step-down transformer 6a to 6d.

In a conventional marine propulsion system, the desired supply network voltage would typically be set by a power management system 26 and provided to the automatic voltage regulator (AVR) 30 of each generator 28. In the arrangement of FIG. 2, the power management system 26 also supplies a voltage demand signal VBUS* to each of the power converters 1a to 1d. The voltage demand signal VBUS* represents the desired voltage to be achieved at the network terminals of each filter 16a to 16d during normal operation of the power converter.

A large inductive component in the form of a transformer 32 is also connected to the common supply bus as shown in FIG. 2.

Motor Bridge Control

The motor bridge controller 18 supplies gate drive command signals to the motor bridge 10 which cause the semiconductor power switching devices to be switched on and off resulting in a particular voltage being applied to the terminals of the motor 4. The motor bridge controller 18 will select the voltage to be applied based on a flux demand signal $\Phi^*$ that represents a desired level of flux to be achieved in the motor 4, a dc link voltage demand signal VDC_MOT* that represents a desired dc link voltage, a dc link voltage feedback signal VDC_FB that is indicative of the actual dc link voltage, one or more feedback signals derived from a measurement of the motor phase currents IU, IV and IW, and a power feedforward signal POWER_FF that represents an indication of the supply network power. The flux demand signal $\Phi^*$ and the dc link voltage demand signal VDC_MOT* will usually be set constants for a particular drive configuration. The difference between the dc link voltage demand signal VDC_MOT* and the dc link voltage feedback signal VDC_FB is used to provide a torque demand signal for the motor 4. A suitable control implementation such as a vector control scheme can use the derived torque demand signal and the flux demand signal $\Phi^*$ to generate the appropriate switching pattern for the semiconductor power switching devices of the motor bridge 10.

It will be readily appreciated that the flux demand signal $\Phi^*$ can be omitted if the ac motor 4 is a synchronous electrical machine. In this case, the switching pattern for the semiconductor power switching devices of the motor bridge 10 will be generated solely on the basis of the derived torque demand signal.

Network Bridge Control

The network bridge controller 20 supplies gate drive command signals to the network bridge 14 which cause the semiconductor power switching devices to be switched on and off resulting in a particular voltage being applied to the filter terminals. The network bridge controller 20 will control the level of real power to be transferred into and out of the dc link 12 based on a power demand signal P* that is provided by a controller 24. The power demand signal P* can be derived by the controller 24 using any suitable reference such as a speed reference N and/or a power reference P. The network bridge controller 20 will also control the voltage to be achieved at the network terminals of the filter 16 based on the voltage demand signal VBUS* that is provided by the power management system 26. Additional signals used by the network bridge controller include one or more feedback signals (V_NET and I_NET) derived from voltage measurements VR, VY and VB (that is the three-phase voltage measurements taken across the so-called red (R), yellow (Y) and blue (B) output lines that supply power to the network bridge 14 from the common supply bus) and current measurements of the network bridge phase currents IR, IY and IB, and a control signal IDC_LIM that is used to limit the level of power that is transferred to the dc link from the common supply bus.

The power demand signal P* is divided by the prevailing quadrature axis network voltage VQ_NET to obtain a quadrature axis current demand signal (i.e. a real current demand signal). The power demand signal P* is also compared against the voltage demand signal VBUS* to derive a reactive current demand signal. A suitable control implementation such as a vector control scheme can use the derived real and reactive current demand signals to generate the appropriate switching pattern for the semiconductor power switching devices of the network bridge 14.

Operation of the Marine Propulsion System

One possible operational implementation of the above marine propulsion topology is as follows. At start up the shaft speed is zero and a dc link voltage demand signal VDC_NET* supplied to the network bridge controller 20 is set to 950 volts. The dc link voltage demand signal VDC_NET* is only used during start up and will usually be a set constant for a particular drive configuration. The semiconductor power switching devices in the network bridge 14 are enabled and under control of the network bridge controller 20 bring the dc link voltage (VDC) up to 950 volts.

At the same time, the dc link voltage demand signal VDC_MOT* applied to the motor bridge controller 18 is set to 1000 volts.

Assuming that the marine propulsion system has a requirement to provide thrust for propulsion of the marine vessel, the semiconductor power switching devices in the motor bridge 10 are enabled and the motor bridge controller 18 will control the direct axis current to achieve the necessary flux in the motor 4. While the dc link voltage is less than the dc link voltage demand signal VDC_MOT* a dc link controller (not shown) in the motor bridge controller 18 will request a negative quadrature axis current in the motor 4 (to return power to the dc link 12) but this will be blocked because the shaft of the propeller assembly 2 is not rotating and there is no shaft power available.

When a thrust requirement is made to the marine propulsion system this will either be supplied to the controller 24 as a power reference P and/or as a speed reference N. The power and/or speed references can be provided to the controller 24 directly from control levers on the bridge of the marine vessel or from a vessel control system, for example, and are labelled on FIG. 1 as vessel control commands. A speed reference N can be converted to the power demand signal P* by the controller 24 as part of a speed control loop with reference to the actual speed of the motor 4 detected by a speed sensor.

Applying the power demand signal P* to the network bridge controller 20 will cause the dc link voltage to increase. Once the dc link voltage reaches the level set by the dc link voltage demand signal VDC_MOT*, the dc link controller of the motor bridge controller 18 will begin to request positive quadrature axis current in an attempt to limit the dc link voltage at the desired set level and will start to accelerate the shaft of the propeller assembly 2.

While the dc link voltage is greater than the dc link voltage demand signal VDC_NET* the voltage control in the network bridge controller 20 is disabled.

The magnitude of the power transfer through the network bridge 14 is limited by a signal derived from the power demand signal P*.

Once an initial steady state has been achieved, the power converter operates in a dynamic manner to accommodate changing thrust requirements. For example, for an increasing thrust requirement (i.e., for an increasing power demand signal P*) the network bridge controller 20 causes the network bridge 14 to import more power from the supply network to the dc link 12. Increasing the amount of power that is imported to the dc link 12 leads to an increase in the dc link voltage. The motor bridge controller 18 responds to this increase in the dc link voltage to cause the motor bridge 10 to draw more power out of the dc link 12 and provides this to the motor 4 until a new steady state is achieved (i.e., where the amount of power that is supplied from the supply network to the dc link 12 is equal to the amount of power that is supplied from the dc link to the motor 4). In this steady state, the dc link voltage has matched the dc link voltage demand signal VDC_MOT*. For a reducing thrust requirement then opposite control actions take place.

The supply network shown in FIG. 2 is a "weak network" since the total generating capacity is closely matched to the total load. In the event of a supply network voltage dip (caused, for example, by the turn-on of the transformer 32) the power converter will detect this reduced voltage, which is seen as a change in the feedback signal V_NET derived from three-phase voltage measurements VR, VY and VB and the network bridge controller 20 will set an appropriate reactive current demand signal to supply reactive current back into the common supply bus. This will help to compensate for the current that is being drawn by the transformer 32 and restore the voltage in the supply network.

In the event of a severe fault somewhere on the common supply bus causing the supply network voltages to be severely reduced then the power converter will set the power demand signal P* to zero and will supply reactive current back to the common supply bus until such time as the supply network voltage has recovered. (In practice, this can be achieved by the network bridge controller 20 effectively overriding the power demand signal P* supplied by the speed/power controller 24 while the fault persists.) During this time, the dc link voltage is sustained by the motor bridge 10 and the kinetic energy in both the motion of the propeller assembly 2 and the momentum of the marine vessel.

In order to improve the transient response of the power converter, two control signals are passed between the motor bridge and network bridge controllers. More particularly, the network bridge controller 20 provides the motor bridge controller 18 with a power feedforward signal POWER_FF that represents an indication of the amount of power that is being transferred into the dc link 12 through the network bridge 14. The power feedforward signal POWER_FF therefore provides the motor bridge controller 18 with advance notice of a change in the level of power flow before the dc link voltage actually starts to increase or decrease. The motor bridge controller 18 provides a control signal IDC_LIM that specifies a dc link current limit. This control signal provides the network bridge controller 20 with a limit as to how much additional current the motor bridge 18 can accept based on the current shaft speed and acceleration limits of the motor 4.

Practical Implementations of the Marine Propulsion Topology

The marine propulsion topology arrangement can be implemented as follows. The motor bridge 18 and network bridge 14 can each be implemented using a MV3000 liquid cooled DELTA inverter module of suitable power rating. This is an IGBT-based voltage source inverter module suitable for operating with ac voltages up to 690 V. The motor bridge controller 18 and the network bridge controller 20 can each be implemented using a PEC controller. This is a microprocessor-based electronic programmable controller that can provide all the necessary control functions and firing pattern generation needed to implement the power converter. The power management system can be implemented on an AMC controller. This is a microprocessor-based electronic controller designed for use in distributed control systems. All of these products are supplied by Converteam Ltd of Boughton Road, Rugby, Warwickshire CV21 1BU, United Kingdom.

The controller arrangement proposes two independent controllers that are coordinated by means of control signals being sent from the motor bridge controller 18 to the network bridge controller 20 and vice versa. It would be equally suitable to integrate the functionality of the controllers on to one physical controller. Similarly, the functionality could be spread across more than two controllers if this is convenient to the practical implementation of the power converter.

The proposed power converter could be used to interface the main propulsion drives or the thruster drives of the marine vessel to the supply network. In either case, the power and/or speed references can be provided to the controller 24 by a vessel control system. In certain cases, the vessel control system can include a dynamic positioning system to provide references to the various propulsion units in order to control the heading and position of the marine vessel.

What is claimed is:

1. A power converter that can be used to interface a motor that requires variable voltage at variable frequency to a supply network providing a nominally fixed voltage and nominally fixed frequency, the power converter comprising:
a first active rectifier/inverter electrically connected to a stator of the motor and including a plurality of semiconductor power switching devices;
a second active rectifier/inverter electrically connected to the supply network and including a plurality of semiconductor power switching devices;
a dc link connected between the first active rectifier/inverter and the second active rectifier/inverter;
a first controller for the first active rectifier/inverter; and
a second controller for the second active rectifier/inverter;
wherein the first controller uses a dc link voltage demand signal indicative of a desired dc link voltage to control the semiconductor power switching devices of the first active rectifier/inverter to achieve the desired level of dc link voltage that corresponds to the dc link voltage demand signal; and
wherein the second controller uses a first demand signal to control the semiconductor power switches of the second active rectifier/inverter to control the level of real power to be transferred into and out of the dc link through the second active rectifier/inverter, and a second demand signal to control the semiconductor power switching devices of the second active rectifier/inverter to control the level of reactive power and/or ac voltage at the supply network.

2. A power converter according to claim 1, wherein the first controller uses a flux demand signal indicative of a desired level of flux to be achieved in the motor to control the semiconductor power switching devices of the first active rectifier/inverter to produce stator electrical quantities that achieve the desired flux in the motor.

3. A power converter according to claim 1, wherein the first controller compares the dc link voltage demand signal indicative of a desired dc link voltage to a dc link voltage feedback signal to determine a torque demand signal indicative of a desired level of torque to be achieved in the motor, and controls the semiconductor power switching devices of the first active rectifier/inverter to produce stator electrical quantities that achieve the desired torque in the motor.

4. A power converter according to claim 1, wherein the first controller supplies a control signal that varies in accordance with the prevailing motor conditions to the second controller and the second controller uses the control signal to limit the level of power that is transferred to the dc link from the supply network through the second active rectifier/inverter.

5. A power converter according to claim 1, wherein the first demand signal is based on a motor demand and the second controller uses the first demand signal to produce desired motor electrical and mechanical quantities.

6. A power converter according to claim 1, wherein the second controller uses the first demand signal to determine a quadrature axis current demand signal for the second active rectifier/inverter indicative of a desired quadrature axis current to be achieved in the supply network, and controls the semiconductor power switching devices of the second active rectifier/inverter to produce filter/supply network electrical quantities that achieve the desired quadrature axis current in the supply network.

7. A power converter according to claim 1, wherein the first demand signal is provided by a controller.

8. A power converter according to claim 7, wherein the controller receives one or more of a power reference, a speed reference, torque reference, and a current reference from a vessel control system.

9. A power converter according to claim 1, wherein the second controller uses the second demand signal to control the semiconductor power switching devices of the second active rectifier/inverter to produce desired filter/supply network electrical quantities.

10. A power converter according to claim 1, wherein the second controller uses the second demand signal to determine a direct axis current demand signal for the second active rectifier/inverter, and controls the semiconductor power switching devices of the second active rectifier/inverter to produce filter/supply network electrical quantities that achieve the desired direct axis current in the supply network.

11. A power converter according to claim 10, wherein the second controller modifies the direct axis current demand signal in accordance with the prevailing supply network voltage conditions.

12. A power converter according to claim 1, wherein the second demand signal is provided by a power management system.

13. A power converter according to claim 1, wherein a signal indicative of the supply network power is supplied to the first controller from the second controller.

14. A power converter according to claim 13, wherein the signal indicative of the supply network power is added to the output of a dc link controller in the first controller and used to determine a desired level of torque in the motor.

15. A power converter according to claim 1, further comprising a filter connected between the second active rectifier/inverter and the supply network, the filter including network terminals.

16. An arrangement comprising a plurality of power converters connected to a common supply bus of a supply network providing a nominally fixed voltage and nominally fixed frequency, each power converter comprising:
a first active rectifier/inverter electrically connected to a stator of a motor and including a plurality of semiconductor power switching devices;
a second active rectifier/inverter electrically connected to the supply network and including a plurality of semiconductor power switching devices;
a dc link connected between the first active rectifier/inverter and the second active rectifier/inverter;
a first controller for the first active rectifier/inverter; and
a second controller for the second active rectifier/inverter;
wherein the first controller uses a dc link voltage demand signal indicative of a desired dc link voltage to control the semiconductor power switching devices of the first active rectifier/inverter to achieve the desired level of dc link voltage that corresponds to the dc link voltage demand signal;
wherein the second controller uses a first demand signal to control the semiconductor power switches of the second active rectifier/inverter to control the level of real power to be transferred into and out of the dc link through the second active rectifier/inverter, and a second demand signal to control the semiconductor power switching devices of the second active rectifier/inverter to control the level of reactive power and/or ac voltage at the supply network; and
wherein the second demand signal is supplied to the second controller of each power converter from a power management system.

17. An arrangement according to claim 16, wherein each individual power converter includes a step-down transformer electrically connected between the associated filter and the common supply bus.

18. A propulsion unit comprising:
a motor having a stator and rotor;
a propeller assembly including at least one blade rotated by the rotor of the motor; and
a power converter for interfacing the motor to a supply network, the power converter comprising:
a first active rectifier/inverter electrically connected to the stator of the motor and including a plurality of semiconductor power switching devices;
a second active rectifier/inverter electrically connected to the supply network and including a plurality of semiconductor power switching devices;
a dc link connected between the first active rectifier/inverter and the second active rectifier/inverter;
a first controller for the first active rectifier/inverter; and
a second controller for the second active rectifier/inverter;
wherein the first controller uses a dc link voltage demand signal indicative of a desired dc link voltage to control the semiconductor power switching devices of the first active rectifier/inverter to achieve the desired level of dc link voltage that corresponds to the dc link voltage demand signal; and
wherein the second controller uses a first demand signal to control the semiconductor power switches of the second active rectifier/inverter to control the level of real power to be transferred into and out of the dc link through the second active rectifier/inverter, and a second demand signal to control the semiconductor power switching devices of the second active rectifier/inverter to control the level of reactive power and/or ac voltage at the supply network.

19. A marine vessel comprising:
a supply network providing a nominally fixed voltage and nominally fixed frequency and having a common supply bus; and
a plurality of propulsion units, each propulsion unit comprising a motor having a stator and rotor, a propeller assembly including at least one blade rotated by the rotor of the motor, and a power converter for interfacing the motor to the supply network, the power converter comprising:
a first active rectifier/inverter electrically connected to the stator of the motor and including a plurality of semiconductor power switching devices;
a second active rectifier/inverter electrically connected to the supply network and including a plurality of semiconductor power switching devices;
a dc link connected between the first active rectifier/inverter and the second active rectifier/inverter;
a first controller for the first active rectifier/inverter; and
a second controller for the second active rectifier/inverter;
wherein the first controller uses a dc link voltage demand signal indicative of a desired dc link voltage to control the semiconductor power switching devices of the first active rectifier/inverter to achieve the desired level of dc link voltage that corresponds to the dc link voltage demand signal; and
wherein the second controller uses a first demand signal to control the semiconductor power switches of the second active rectifier/inverter to control the level of real power to be transferred into and out of the dc link through the second active rectifier/inverter, and a second demand signal to control the semiconductor power switching devices of the second active rectifier/inverter to control the level of reactive power and/or ac voltage at the supply network;
wherein the respective power converters of the plurality of propulsion units are connected to the common supply bus and wherein the second demand signal is supplied by a power management system.

20. A method of operating a power converter that can be used to interface a motor that requires variable voltage at variable frequency to a supply network providing a nominally fixed voltage and nominally fixed frequency, the power converter comprising:
a first active rectifier/inverter electrically connected to a stator of the motor and including a plurality of semiconductor power switching devices;
a second active rectifier/inverter electrically connected to the supply network and including a plurality of semiconductor power switching devices;
a dc link connected between the first active rectifier/inverter and the second active rectifier/inverter;
a first controller for the first active rectifier/inverter; and
a second controller for the second active rectifier/inverter;
wherein the method comprises the steps of:
the first controller using a dc link voltage demand signal indicative of a desired dc link voltage to control the semiconductor power switching devices of the first active rectifier/inverter to achieve the desired level of dc link voltage that corresponds to the dc link voltage demand signal; and
the second controller using a first demand signal to control the semiconductor power switches of the second active rectifier/inverter to control the level of real power to be transferred into and out of the dc link through the second active rectifier/inverter, and a second demand signal to control the semiconductor power switching devices of the second active rectifier/inverter to control the level of reactive power and/or ac voltage at the supply network.

21. A method according to claim 20, further comprising the step of the first controller using a flux demand signal indicative of a desired level of flux to be achieved in the motor to control the semiconductor power switching devices of the first active rectifier/inverter to produce stator electrical quantities that achieve the desired flux in the motor.

22. A method according to claim 20, further comprising the step of first controller comparing the dc link voltage demand signal indicative of a desired dc link voltage to a dc link voltage feedback signal to determine a torque demand signal indicative of a desired level of torque to be achieved in the motor, and controlling the semiconductor power switching devices of the first active rectifier/inverter to produce stator electrical quantities that achieve the desired torque in the motor.

23. A method according to claim 20, further comprising the steps of the first controller supplying a control signal that varies in accordance with the prevailing motor conditions to the second controller and the second controller using the control signal to limit the level of power that is transferred to the dc link from the supply network through the second active rectifier/inverter.

24. A method according to claim 20, wherein the first demand signal is based on a motor demand and further comprising the step of the second controller using the first demand signal to produce desired motor electrical and mechanical quantities.

25. A method according to claim 20, further comprising the step of the second controller using the first demand signal to determine a quadrature axis current demand signal for the second active rectifier/inverter indicative of a desired quadrature axis current to be achieved in the supply network, and controlling the semiconductor power switching devices of the second active rectifier/inverter to produce filter/supply network electrical quantities that achieve the desired quadrature axis current in the supply network.

26. A method according to claim 20, wherein the first demand signal is provided by a controller.

27. A method according to claim 26, further comprising the step of the controller receiving one or more of a power reference, a speed reference, a torque reference, and a current reference from a vessel control system.

28. A method according to claim 20, further comprising the step of the second controller using the second demand signal to control the semiconductor power switching devices of the second active rectifier/inverter to produce desired filter/supply network electrical quantities.

29. A method according to claim 20, further comprising the step of the second controller using the second demand signal to determine a direct axis current demand signal for the second active rectifier/inverter, and controlling the semiconductor power switching devices of the second active rectifier/inverter to produce filter/supply network electrical quantities that achieve the desired direct axis current in the supply network during a supply network voltage dip situation.

30. A method according to claim 29, wherein the second controller modifies the direct axis current demand signal in accordance with the prevailing supply network voltage conditions during a supply network voltage dip situation.

31. A method according to claim 20, wherein the second demand signal is provided by a power management system.

32. A method according to claim 20, further comprising the step of supplying a signal indicative of the supply network power to the first controller from the second controller.

33. A method according to claim 32, wherein the signal indicative of the supply network power is added to the output of a dc link controller in the first controller and used to determine a desired level of torque in the motor.

34. A method of operating a plurality of power converters connected to a common supply bus of a supply network providing a nominally fixed voltage and nominally fixed frequency, each power converter comprising:
  a first active rectifier/inverter electrically connected to a stator of a motor and including a plurality of semiconductor power switching devices;
  a second active rectifier/inverter electrically connected to the supply network and including a plurality of semiconductor power switching devices;
  a dc link connected between the first active rectifier/inverter and the second active rectifier/inverter;
  a first controller for the first active rectifier/inverter; and
  a second controller for the second active rectifier/inverter;
  wherein the first controller uses a dc link voltage demand signal indicative of a desired dc link voltage to control the semiconductor power switching devices of the first active rectifier/inverter to achieve the desired level of dc link voltage that corresponds to the dc link voltage demand signal;
  wherein the second controller uses a first demand signal to control the semiconductor power switches of the second active rectifier/inverter to control the level of real power to be transferred into and out of the dc link through the second active rectifier/inverter, and a second demand signal to control the semiconductor power switching devices of the second active rectifier/inverter to control the level of reactive power and/or ac voltage at the supply network;
the method comprising the step of supplying the second demand signal to the second controller of each power converter from a power management system.

\* \* \* \* \*